United States Patent
Mitani et al.

(10) Patent No.: US 8,899,028 B2
(45) Date of Patent: Dec. 2, 2014

(54) PARTICULATE MATTER PROCESSING APPARATUS

(75) Inventors: Shinichi Mitani, Susono (JP); Hiroshi Nomura, Gotenba (JP); Eiji Murase, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/703,573

(22) PCT Filed: Mar. 16, 2011

(86) PCT No.: PCT/JP2011/056293
§ 371 (c)(1),
(2), (4) Date: Dec. 11, 2012

(87) PCT Pub. No.: WO2012/124086
PCT Pub. Date: Sep. 20, 2012

(65) Prior Publication Data
US 2013/0340416 A1    Dec. 26, 2013

(51) Int. Cl.
| | | |
|---|---|---|
| F01N 3/02 | (2006.01) | |
| F01N 11/00 | (2006.01) | |
| F01N 9/00 | (2006.01) | |
| F01N 3/021 | (2006.01) | |
| F01N 3/01 | (2006.01) | |
| B03C 3/38 | (2006.01) | |
| B03C 3/017 | (2006.01) | |
| B03C 3/68 | (2006.01) | |
| B03C 3/41 | (2006.01) | |

(52) U.S. Cl.
CPC ............... *F01N 3/021* (2013.01); *F01N 11/00* (2013.01); *F01N 9/00* (2013.01); *B03C 2201/24* (2013.01); *Y02T 10/47* (2013.01); *F01N 3/01* (2013.01); *B03C 3/383* (2013.01); *F01N 2900/0404* (2013.01); *B03C 2201/06* (2013.01); *F01N 2900/08* (2013.01); *Y02T 10/20* (2013.01); *B03C 3/0175* (2013.01); *B03C 3/68* (2013.01); *F01N 2240/04* (2013.01); *B03C 2201/30* (2013.01); *B03C 3/41* (2013.01)
USPC .............................................. 60/311; 60/277

(58) Field of Classification Search
CPC ........ B03C 3/383; B03C 3/68; B03C 3/0175; B03C 3/41; F01N 9/00; F01N 11/00; F01N 3/01; F01N 3/021
USPC .................................................. 60/277, 311
See application file for complete search history.

(56) References Cited

U.S. PATENT DOCUMENTS

| | | | | |
|---|---|---|---|---|
| 7,464,538 | B2 * | 12/2008 | Miki et al. ...................... | 60/275 |
| 2008/0105567 | A1 * | 5/2008 | Okayama et al. .............. | 205/775 |
| 2014/0000243 | A1 * | 1/2014 | Mitani et al. ................... | 60/275 |

FOREIGN PATENT DOCUMENTS

| | | |
|---|---|---|
| JP | 06-159035 A | 6/1994 |
| JP | 2001-098932 A | 4/2001 |

(Continued)

*Primary Examiner* — Thomas Denion
*Assistant Examiner* — Jason Shanske
(74) *Attorney, Agent, or Firm* — Sughrue Mion, PLLC

(57) ABSTRACT

Aggregation of particulate matter is facilitated. Provision is made for an electrode that is arranged in an exhaust passage of an internal combustion engine with a voltage to be applied thereto being able to be changed, a detection device that detects an electric current passing through the electrode, a determination device that determines whether a pulse current has been generated in the electric current detected by the detection device, and a control device that reduces the voltage to be applied more than that at this time in cases where a determination has been made by the determination device that a pulse current has been generated.

5 Claims, 7 Drawing Sheets

(56) References Cited

FOREIGN PATENT DOCUMENTS

| | | | | |
|---|---|---|---|---|
| JP | 2003269134 A | * | 9/2003 | ............... F01N 3/02 |
| JP | 2006-194116 A | | 7/2006 | |
| JP | 2006-342730 A | | 12/2006 | |

* cited by examiner

Fig. 4

| COOLING WATER TEMPERATURE 20°C | | LOAD(%) | | | | | |
|---|---|---|---|---|---|---|---|
| | | 10 | 20 | 40 | 60 | 80 | 100 |
| NUMBER OF ENGINE REVOLUTIONS PER UNIT TIME (rpm) | 800 | NUMBER OF PARTICLES IN PARTICULATE MATTER(pieces/cm$^3$) | | | | | |
| | 1600 | | | | | | |
| | 2400 | | | | | | |
| | 3200 | | | | | | |
| | 4000 | | | | | | |
| | 4800 | | | | | | |
| | 5600 | | | | | | |
| | 6400 | | | | | | |

Fig. 5

| | | NUMBER OF PARTICLES IN PARTICULATE MATTER ($\times 10^5$pieces/cm$^3$) | | | | | |
|---|---|---|---|---|---|---|---|
| | | 2 | 4 | 6 | 8 | 10 | 12 |
| AMOUNT OF EXHAUST GAS (g/sec) | 10 | \multicolumn{6}{c}{VOLTAGE TO BE APPLIED(V)} | | | | | |
| | 20 | | | | | | |
| | 40 | | | | | | |
| | 60 | | | | | | |
| | 80 | | | | | | |
| | 100 | | | | | | |
| | 120 | | | | | | |
| | 140 | | | | | | |

PARTICULATE MATTER PROCESSING APPARATUS

CROSS REFERENCE TO RELATED APPLICATIONS

This application is a National Stage of International Application No. PCT/JP2011/056293 filed Mar. 16, 2011, the contents of which are incorporated herein by reference in their entirety.

TECHNICAL FIELD

The present invention relates to a particulate matter processing apparatus.

BACKGROUND ART

There has been known a technique in which a discharge electrode is arranged in an exhaust passage of an internal combustion engine, and a corona discharge is caused to occur from the discharge electrode, whereby particulate matter (hereinafter also referred to as PM) is charged and condensed or aggregated (see, for example, a first patent document). By the condensation or aggregation of the particulate matter, the number of particles in the particulate matter can be decreased. In addition, the sizes of particles in the particulate matter become large, so when a filter is arranged at a downstream side, it becomes easy to trap the particulate matter with the filter. Moreover, in a particulate matter processing apparatus using a corona discharge, there has been known a technique of ensuring insulation of a discharge electrode (see, for example, a second patent document).

However, when a corona discharge is caused to be generated, particulate matter will be crushed into fine particles by means of high-speed electrons resulting from a strong electric discharge. Then, the effect of causing particulate matter to aggregate will become low. For this reason, the particle size of the particulate matter will become small, and the number of particles in the particulate matter will increase.

PRIOR ART REFERENCES

Patent Documents

First Patent Document: Japanese patent application laid-open No. 2006-194116
Second Patent Document: Japanese patent application laid-open No. 2006-342730

SUMMARY OF THE INVENTION

Problems to be Solved by the Invention

The present invention has been made in view of the problem as referred to above, and has for its object to facilitate aggregation of particulate matter.

Means for Solving the Problems

In order to achieve the above-mentioned object, a particulate matter processing apparatus according to the present invention is provided with:

an electrode that is arranged in an exhaust passage of an internal combustion engine with a voltage to be applied thereto being able to be changed;

a detection device that detects an electric current passing through said electrode;

a determination device that determines whether a pulse current has been generated in the electric current detected by said detection device; and a control device that reduces said voltage to be applied more than that at this time in cases where a determination has been made by said determination device that a pulse current has been generated.

Then, it is possible to suppress a pulse current from being generated in the electric current passing through the electrode. Here, it is considered that when a pulse current is generated, a strong electric discharge is generated in the electrode. There is a fear that the particulate matter may be made finer by means of this strong electric discharge. On the other hand, when a pulse current has been generated, by reducing the voltage to be applied, it is possible to suppress a strong electric discharge from being made finer. Here, note that the particulate matter can be made to aggregate even if the voltage to be applied is such that a strong electric discharge such as a corona discharge, an arc discharge, etc., is not caused to occur. Accordingly, if the occurrence of a pulse current is suppressed by reducing the voltage to be applied at the time when a pulse current has been generated, it is possible to cause the particulate matter to aggregate, while suppressing the particulate matter from being made finer.

In addition, in the present invention, said control device can increase said voltage to be applied more than that at this time in cases where a determination has been made by said determination device that a pulse current is not generated.

Here, it becomes easier for the particulate matter to aggregate by making the voltage to be applied larger within a range in which a pulse current is not generated. That is, by increasing the voltage to be applied within the range in which a pulse current is not generated, it is possible to facilitate the aggregation of the particulate matter. Here, note that feedback control may be carried out so that the voltage to be applied becomes the largest within the range in which a pulse current is not generated.

Moreover, in the present invention, provision is further made for:

a processing part that is arranged in said exhaust passage with said electrode installed therein;

an insulation part that insulates electricity between said processing part and said exhaust passage;

a ground part that grounds said processing part; and a power supply that is connected to said electrode and applies a voltage thereto;

wherein said detection device can detect the electric current in said ground part.

Specifically, the detection device may detect the electric current at an electric potential reference point side from the electrode. In general, wiring is made often longer or thicker at a power supply side from the electrode than at a ground side from the electrode. In addition, electric charges may be stored at the power supply side from the electrode. Then, in cases where an electric current is detected in the power supply side from the electrode, even if a strong electric discharge is generated in the electrode, the rising and falling of the electric current detected by the detection device at that time become slow. For this reason, it may be difficult to detect a pulse current.

On the other hand, in the ground side from the electrode, wiring can be made relatively short and thin. For this reason, in cases where an electric current is detected in the ground side from the electrode, it is easy to detect the electric current when a strong electric discharge has been generated. Accordingly, by detecting an electric current in the ground side from the electrode, it is possible to detect the occurrence of a strong electric discharge in a more accurate manner. As a result of this, the voltage to be applied can be reduced in a more reliable manner at the time when a strong electric discharge is generated, so the aggregation of particulate matter can be further facilitated.

Further, due to the provision of the insulation part, it is possible to suppress electricity from flowing to other than the ground part. For this reason, it is possible to detect a pulse current in a more accurate manner when a strong electric discharge is generated.

In addition, in the present invention, said electrode may be lower in electric potential than said processing part.

Here, when the electrode is made lower in electric potential than the processing part, particulate matter can be charged to a negative polarity. The particulate matter thus charged to the negative polarity is caused to move toward an inner wall of the processing part by a Coulomb force or a flow of the exhaust gas. The particulate matter, which has reached the inner wall of the processing part, releases electrons to the processing part, so electricity flows to the ground side rather than to the electrode. Then, the particulate matter, which has released the electrons, aggregates with other particulate matter which exists nearby, so it is possible to decrease the number of particles.

Moreover, in the present invention, in cases where a high frequency component has been extracted by causing the electric current detected by said detection device to pass through a high pass filter, said determination device can make a determination that a pulse current has been generated.

According to the high pass filter, it is possible to extract a high frequency component and to interrupt or block a low frequency component. Here, the low frequency component is an electric current which is generated at the time when the particulate matter is charged. In addition, the high frequency component is a pulse current which is generated by the strong electric discharge. Here, the larger the voltage to be applied, the larger the electric current detected by the detection device becomes. For this reason, only by detecting a maximum value of the electric current alone, it may not be distinguishable whether the maximum value of the electric current is large due to a large voltage to be applied or the maximum value of the electric current is large due to the generation of a pulse current. On the other hand, when a high frequency component is extracted by the high pass filter, a pulse current can be detected without regard to the voltage to be applied.

Effect of the Invention

According to the present invention, it is possible to facilitate the aggregation of particulate matter.

BRIEF DESCRIPTION OF THE DRAWINGS

[FIG. 4] is a view showing an example of a map for calculating the number of particles in particulate matter from the number of engine revolutions per unit time and an engine load.

[FIG. 5] is a view showing an example of a map for calculating a voltage to be applied based on an amount of exhaust gas from an internal combustion engine, and the number of particles in particulate matter.

MODE FOR CARRYING OUT THE INVENTION

Hereinafter, reference will be made to a specific embodiment of a particulate matter processing apparatus according to the present invention based on the attached drawings.
(First Embodiment)

Figure 1:
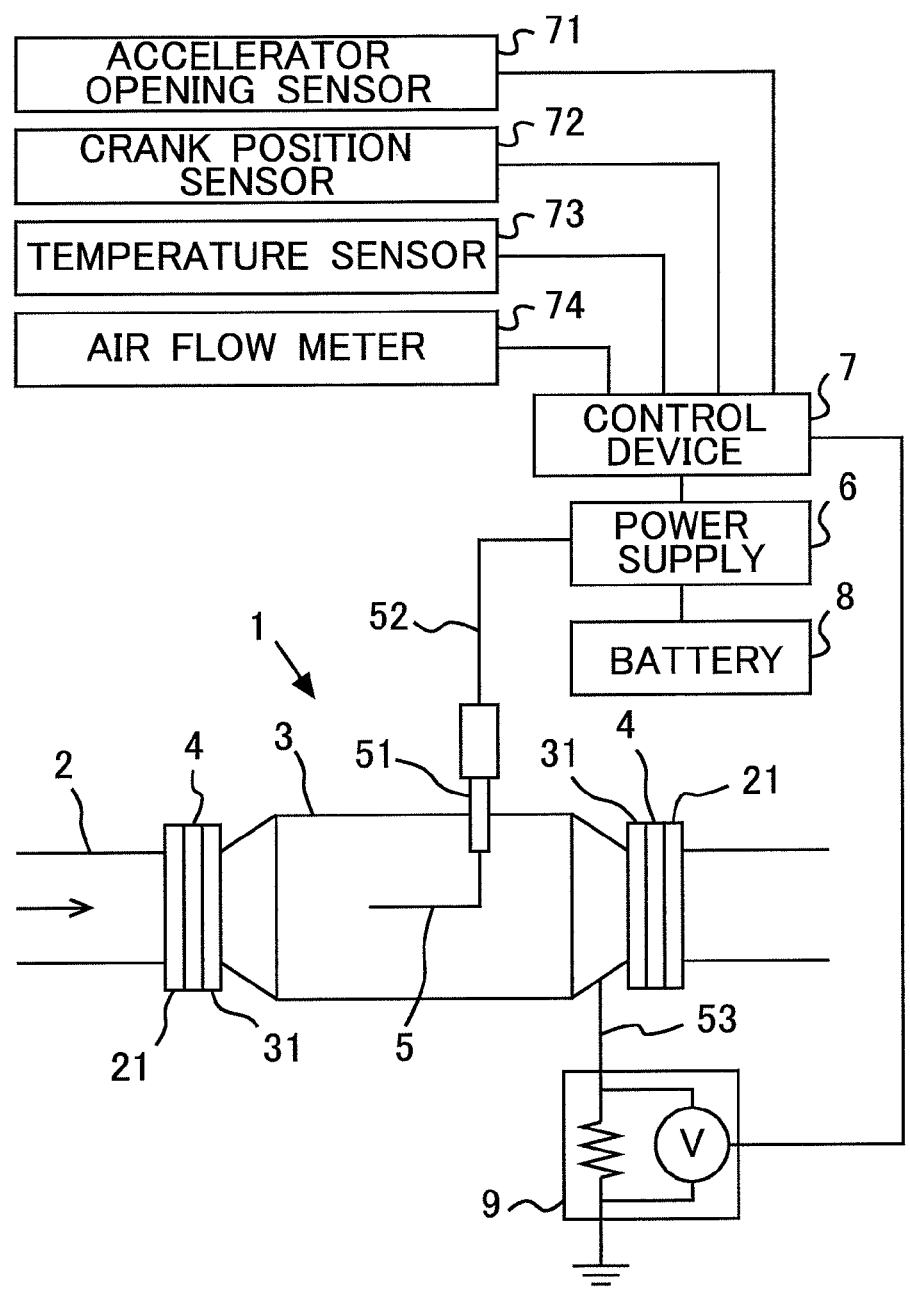
[FIG. 1] is a view showing the schematic construction of a particulate matter processing apparatus according to an embodiment of the present invention.

FIG. 1 is a view showing the schematic construction of a particulate matter processing apparatus 1 according to this first embodiment of the present invention. The particulate matter processing apparatus 1 is arranged, for example, in an exhaust passage 2 of a gasoline engine. Here, note that the particulate matter processing apparatus can also be arranged in an exhaust passage of a Diesel engine.

The particulate matter processing apparatus 1 is constructed to be provided with a housing 3 which is connected at its opposite ends with the exhaust passage 2. As a material for the housing 3, there is used a stainless steel material. The housing 3 is formed into a hollow cylindrical shape with its diameter being larger than that of the exhaust passage 2. The opposite end portions of the housing 3 are each formed into a tapered shape of which the cross-sectional area becomes smaller as they become closer to their end. Here, note that in FIG. 1, an exhaust gas flows through the exhaust passage 2 in the direction of an arrow, and flows into the interior of the housing 3. For this reason, the housing 3 may also be a part of the exhaust passage 2. Here, note that in this embodiment, the housing 3 corresponds to a processing part in the present invention.

The exhaust passage 2 and the housing 3 are connected to each other through insulation parts 4. The insulation parts 4 are each made of an electrically insulating material. The insulation parts 4 are each sandwiched between a flange 21, which is formed at an end of the exhaust passage 2, and a flange 31, which is formed at one adjacent end of the housing 3. The exhaust passage 2 and the housing 3 are fastened to each other, for example, by means of bolts and nuts. Then, these bolts and nuts are also subjected to insulation processing so as to prevent electricity from flowing through these bolts and nuts. In this manner, electricity is prevented from flowing between the exhaust passage 2 and the housing 3.

An electrode 5 is mounted on the housing 3. The electrode 5 penetrates through a side surface of the housing 3, extends from the side surface of the housing 3 in the direction of a central axis thereof, is then bent to an upstream side of the flow of the exhaust gas in the vicinity of the central axis, and extends toward the upstream side of the flow of the exhaust gas in parallel to the central axis. For this reason, an end of the electrode 5 is located in the vicinity of the central axis of the housing 3. In addition, the electrode 5 is provided with an insulator part 51 which is made of an electrically insulating material, and which serves to prevent electricity from flowing between the electrode 5 and the housing 3. This insulator part 51 is located between the electrode 5 and the housing 3, and has a function of insulating electricity and at the same time fixedly securing the electrode 5 to the housing 3.

Then, the electrode 5 is connected to a power supply 6 through a power supply side electric wire 52. The power supply 6 can supply electricity to the electrode 5 and at the same time change a voltage to be applied thereto. This power supply 6 is connected to a control device 7 and a battery 8 through electric wires, respectively. The control device 7 controls the voltage which is applied to the electrode 5 by the power supply 6.

Also, a ground side electric wire 53 is connected to the housing 3, so that the housing 3 is connected to ground through the ground side electric wire 53. A detection device 9, which serves to detect the electric current passing through the ground side electric wire 53, is provided or connected to the ground side electric wire 53. The detection device 9 detects the electric current, for example, by measuring a potential difference between opposite ends of a resistor which is provided or inserted in the middle of the ground side electric wire 53. This detection device 9 is connected to the control device 7 through an electric wire. Then, the electric current detected by the detection device 9 is inputted to the control device 7. Here, note that in this embodiment, the ground side electric wire 53 corresponds to a ground portion in the present invention.

Here, note that an accelerator opening sensor 71, a crank position sensor 72, a temperature sensor 73, and an air flow meter 74 are connected to the control device 7. The accelerator opening sensor 71 detects an engine load by outputting an electric signal corresponding to an amount of depression of an accelerator pedal at which the driver of a vehicle with the internal combustion engine installed thereon has depressed or stepped down the accelerator pedal. The crank position sensor 72 detects the number of engine revolutions per unit time. The temperature sensor 73 detects the temperature of the internal combustion engine by detecting the temperature of cooling water or the temperature of lubricating oil in the internal combustion engine. The air flow meter 74 detects an amount of intake air sucked into the internal combustion engine.

In the particulate matter processing apparatus 1 as constructed in this manner, electrons are released or emitted from the electrode 5 by applying a negative high direct current voltage from the power supply 6 to the electrode 5. That is, electrons are caused to be released from the electrode 5 by making the electric potential of the electrode 5 lower than that of the housing 3. Then, particulate matter in the exhaust gas can be charged to a negative polarity by means of these electrons. The particulate matter thus charged to a negative polarity is caused to move by means of a Coulomb force and a gas stream of the exhaust gas. Thereafter, when the particulate matter reaches the housing 3, the electrons, which have charged the particulate matter to a negative polarity, are released to the housing 3. The particulate matter, which has released the electrons to the housing 3, aggregates, thereby making larger the particle diameter or size of each particle. In addition, the number of particles in the particulate matter is reduced due to the aggregation of the particulate matter. That is, by applying the voltage to the electrode 5, the diameters or sizes of particles in the particulate matter can be made larger, and the number of particles in the particulate matter can be made to reduce.

It is to be noted that in this embodiment, the electrode 5 is bent toward the upstream side of the flow of the exhaust gas, but instead of this, it may be bent toward a downstream side thereof. Here, when the electrode 5 is bent toward the upstream side of the flow of the exhaust gas, as in the case of this embodiment, it is difficult for particulate matter to adhere to or deposit on the insulator part 51. That is, particulate matter can be caused to be charged at the upstream side of the insulator part 51, so that the particulate matter goes to an inner peripheral surface of the housing 3. For this reason, particulate matter colliding with the insulator part 51 decreases, and hence, it becomes difficult for particulate matter to adhere to the insulator part 51. However, when the electrode 5 is bent toward the upstream side of the flow of the exhaust gas, the electrode 5 will be liable to be deformed due to a force or pressure received from the flow of the exhaust gas. For this reason, this is suitable in cases where the electrode 5 is short. On the other hand, when the electrode 5 is bent toward the downstream side of the flow of the exhaust gas, particulate matter will be liable to adhere to the insulator part 51, but the electrode 5 will be less prone to be deformed even if it receives a force or pressure from the flow of the exhaust gas. For this reason, it is possible to make the electrode 5 long with high durability and high reliability.

However, when a negative voltage applied to the electrode 5 is made larger, more electrons will be released or emitted from the electrode 5, so the number of particles in particulate matter can be further deceased. But, when the voltage to be applied to the electrode 5 is made too large, a strong electric discharge such as a corona discharge, an arc discharge, etc., can take place. When such a strong electric discharge takes place, particulate matter will be made finer by means of high speed electrons. Accordingly, in order to decrease the number of particles in particulate matter, it is preferable to adjust the voltage to be applied to a voltage lower than that at which a strong electric discharge such as a corona discharge, etc., takes place.

Figure 2:
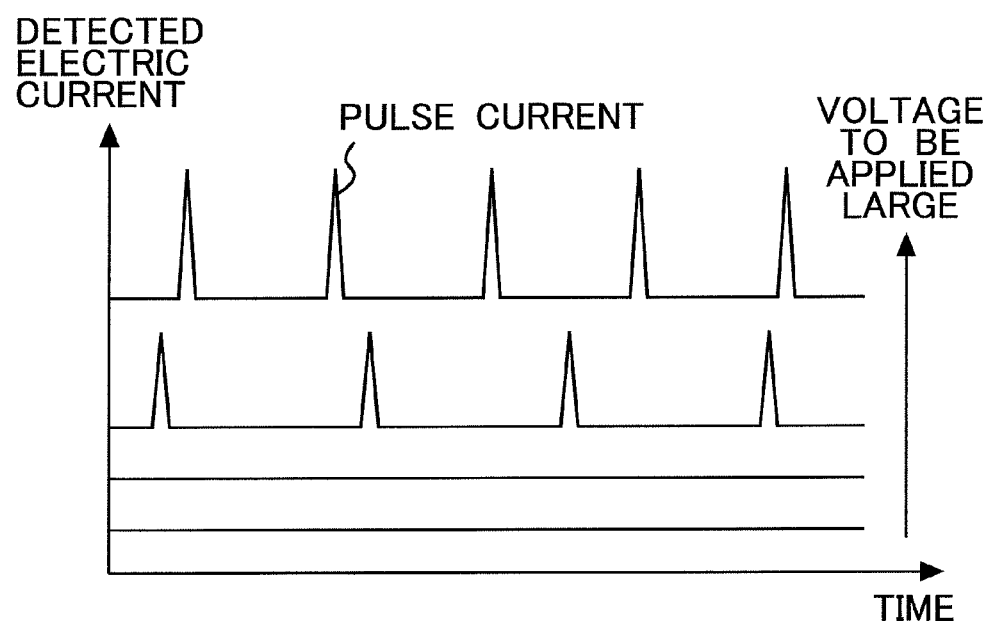
[FIG. 2] is a view showing the changes over time of electric currents detected by a detection device according to individual voltages to be applied.

Here, when a strong electric discharge takes place in the electrode 5, the electric current passing through the electrode 5 falls immediately after having risen rapidly. FIG. 2 is a view showing the changes over time of electric currents detected by the detection device 9 according to individual voltages to be applied. The larger the voltage to be applied, the larger the electric current detected by the detection device 9 becomes. Then, the electric current detected when the voltage to be applied is relatively small becomes substantially constant. When the electric current is substantially constant, no strong electric discharge is generated. However, particulate matter is charged to a negative polarity by means of electrons released from the electrode 5, and the particulate matter thus charged then releases or emits electrons to the housing 3, so an electric current can be detected. That is, particulate matter can be made to aggregate even if a strong electric discharge such as a corona discharge, etc., does not occur.

On the other hand, when the voltage to be applied becomes relatively large, the electric current detected by the detection device 9 becomes large, and at the same time, a pulse current is generated. Then, the larger the voltage to be applied, the higher becomes the frequency at which a pulse current is generated. This pulse current is generated by a strong electric discharge such as a corona discharge, etc.

Accordingly, in this embodiment, when a pulse current is generated, the voltage to be applied is made smaller. This suppresses the pulse current from being generated, and also suppresses the number of particles in particulate matter from being increased. On the other hand, the voltage to be applied is made larger until a pulse current is generated. As a result of this, the voltage to be applied can be made as high as possible, so the number of particles in particulate matter can be further decreased. Here, note that before a pulse current is generated, by reading from the electric current a sign that a pulse current will be generated, the voltage to be applied may be made smaller before the generation of a pulse current.

Figure 3:
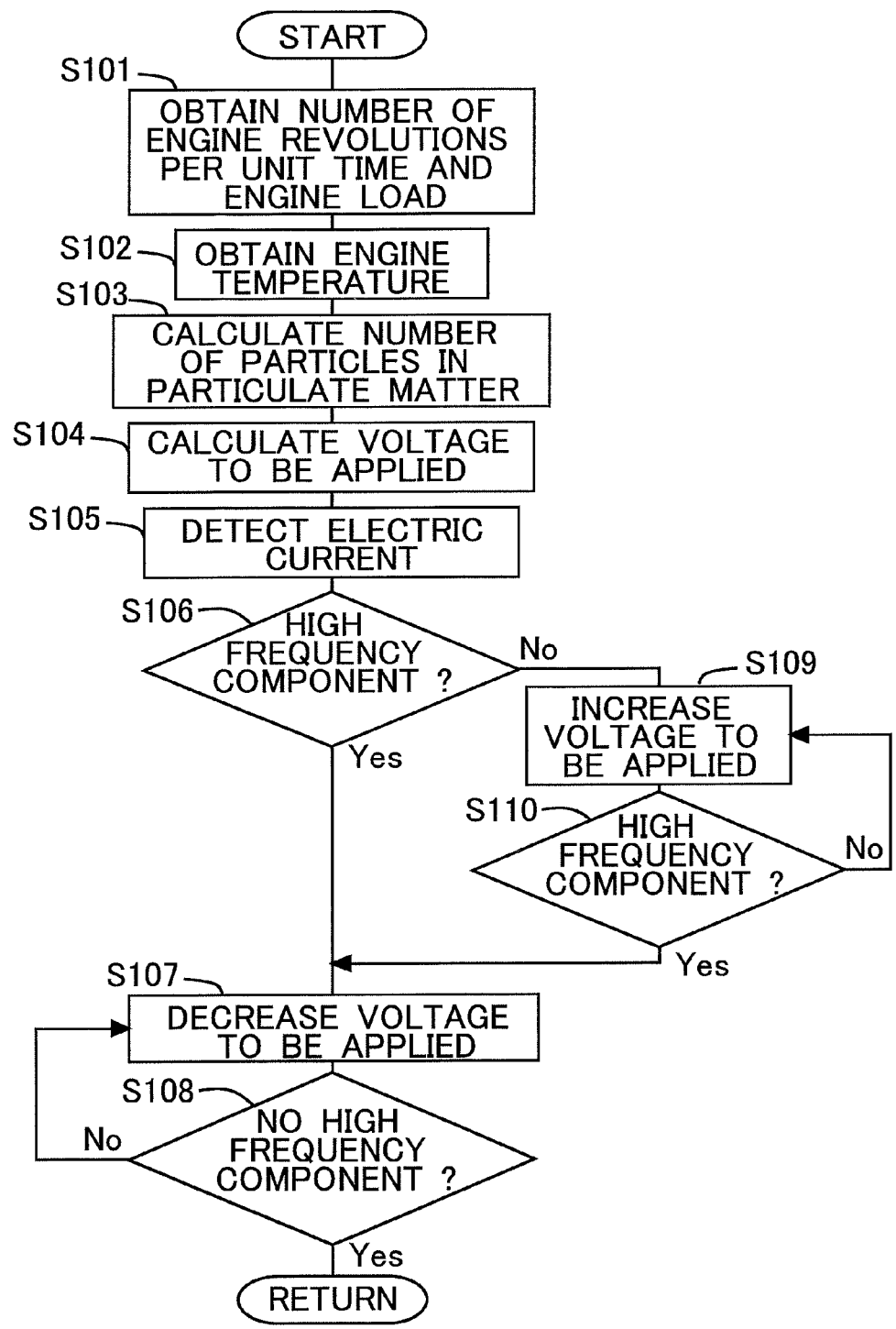
[FIG. 3] is a flow chart showing a control flow of a voltage to be applied according to the embodiment.

FIG. 3 is a flow chart showing a control flow of a voltage to be applied according to this embodiment. This routine is carried out by means of the control device 7 in a repeated manner at each predetermined time interval.

In steps S101 through S103, the number of particles in the particulate matter (pieces/cm$^3$) is calculated. The number of particles in the particulate matter is the number of particles in the particulate matter per cubic centimeter. This number of particles in the particulate matter is the number of particles in the particulate matter which are discharged from the internal combustion engine, and is the number of particles in the particulate matter before the particulate matter flows into the housing 3. The number of particles in the particulate matter has a correlation with the number of engine revolutions per unit time, the engine load, and the temperature of the internal combustion engine (e.g., the temperature of lubricating oil or the temperature of cooling water), and hence is calculated based on these values.

For this reason, in step S101, the number of engine revolutions per unit time and the engine load are obtained. The number of engine revolutions per unit time is detected by the crank position sensor 72, and the engine load is detected by the accelerator opening sensor 71. In addition, in step S102, the temperature of the internal combustion engine is obtained. The temperature of the internal combustion engine is detected by the temperature sensor 73.

In step S103, the number of particles in the particulate matter is calculated. Here, FIG. 4 is a view showing an example of a map for calculating the number of particles in particulate matter from the engine revolutions per minute and the engine load. This relation is stored in plurality in the control device 7 according to the temperature of the internal combustion engine. Then, the number of particles in the particulate matter is obtained from the number of engine revolutions per unit time and the engine load by the use of a map corresponding to the detected temperature of the internal combustion engine. This map has beforehand been obtained through experiments, etc. Here, note that the number of particles in the particulate matter may be detected by the use of such a map, but a sensor for detecting the number of particles in the particulate matter may be mounted on the exhaust passage 2 at a location upstream of the housing 3, so that the number of particles in the particulate matter can also be detected by this sensor.

Then, in step S104, a voltage to be applied to the electrode 5 is calculated based on the number of particles in the particulate matter calculated in step S103. This voltage to be applied is a voltage which is first applied to the electrode 5. Then, by using, as an initial value, the voltage to be applied calculated in step S104, feedback control is carried out so that the voltage to be applied becomes the largest in a range in which no pulse current will be generated. That is, in this step, the initial value of the voltage to be applied is set in order to shorten the time until the largest voltage to be applied is reached in the range in which no pulse current will be generated. The initial value of the voltage to be applied is set based on FIG. 5.

FIG. 5 is a view showing an example of a map for calculating a voltage to be applied (V) based on an amount of exhaust gas (g/sec) from the internal combustion engine, and the number of particles in the particulate matter (×10$^5$ pieces/cm$^3$). This map has beforehand been obtained through experiments, etc. The amount of exhaust gas from the internal combustion engine has a correlation with the amount of intake air in the internal combustion engine, and hence, can be obtained based on the amount of intake air detected by the air flow meter 74.

Here, the smaller the amount of exhaust gas, the smaller the inertia force of the particulate matter becomes, and hence, the influence of an electrostatic action becomes relatively larger. For this reason, it becomes easy for the particulate matter to aggregate. Accordingly, the smaller the amount of exhaust gas, with the smaller voltage to be applied, the particulate matter aggregates. For this reason, the smaller the amount of exhaust gas, the smaller the voltage to be applied is made. In addition, the more the number of particles in the particulate matter, the shorter become the distances between adjacent particles in the particulate matter, and hence, the influence of the electrostatic action becomes relatively larger. For this reason, the more the number of particles in the particulate matter, with the smaller voltage to be applied, the particulate matter aggregates. As a result, the more the number of particles in the particulate matter, the smaller the voltage to be applied is made.

Here, note that the initial value of the voltage to be applied may also be, for example, such a value that the reduction or decrease rate of the number of particles in the particulate matter becomes a predetermined value (e.g., 40%). In addition, the initial value of the voltage to be applied may also be a specified value which has been set beforehand. This specified value can be made to a value with such a margin that no pulse current is generated.

Then, after the voltage to be applied has been calculated, the routine goes to step S105, in which an electric current is obtained. This electric current is a value which is detected by the detection device 9. The electric current detected at this time changes, for example, as shown in FIG. 2.

Figure 6:
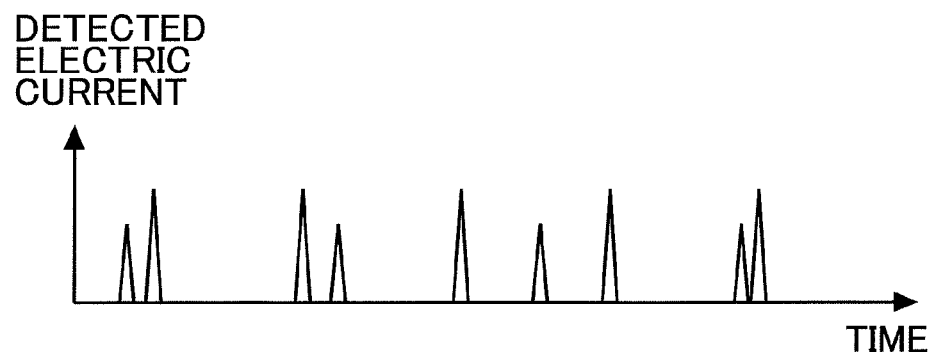
[FIG. 6] is a view at the time when only high frequency components are extracted by passing the electric currents shown in FIG. 2 through a high pass filter.

Thereafter, in step S106, it is determined whether there exists a high frequency component of the electric current. A pulse current can be extracted as a high frequency component of the electric current. Accordingly, a high frequency component is extracted by causing the electric current detected by the detection device 9 to pass through a high pass filter. FIG. 6 is a view at the time when only high frequency components are extracted by passing the electric currents shown in FIG. 2 through a high pass filter. In this manner, in cases where a high frequency component has been extracted by the passage of the electric current through the high pass filter, a determination is made that there exists a high frequency component.

Here, note that the determination as to whether there exists a high frequency component in electric current can also be made based on whether a standard deviation of the electric current is larger than a predetermined value. Here, a standard deviation S of electric current detected n times is calculated by the following equation.

$$S = \sqrt{\frac{\sum_{m=1}^{n}(I_m - Iave)^2}{n}} \quad \text{[Equation 1]}$$

where Im is the detected electric current, and Iave is an average value of the detected electric current.

It is determined whether the standard deviation S thus calculated is larger than a predetermined value Smax, and if so, a determination is made that there exists a high frequency component. The predetermined value Smax is a fixed value for determining the presence or absence of a high frequency component, and has beforehand been calculated through experiments, etc. In addition, for example, in cases where the rate of rise of the detected electric current is equal to or larger than a threshold value, and in cases where the amount of rise is equal to or larger than a threshold value, a determination can also be made that there exists a high frequency component. Here, note that in this embodiment, the control device 7, which carries out the processing of step S106, corresponds to a determination device in the present invention. Then, in cases where an affirmative determination is made in step S106, the routine goes to step S107.

In step S107, the voltage to be applied is decreased so as to suppress the occurrence of a pulse current. An optimum value for an amount at which the voltage to be applied is decreased may have beforehand been obtained through experiments, etc.

Then, in step S108, it is determined whether there does not exist a high frequency component. That is, it is determined whether a pulse current is no longer generated due to the decrease of the voltage to be applied. This determination is carried out as in step S106. In cases where an affirmative determination is made in step S108, this routine is ended. On the other hand, in cases where a negative determination is made in step S108, a return is made to step S107, and the voltage to be applied is decreased again. In this manner, the voltage to be applied is decreased until a pulse current is not generated.

On the other hand, in cases where a negative determination is made in step S106, the routine goes to step S109.

In step S109, the voltage to be applied is increased. As a result of this, the aggregation of particulate matter is facilitated. An optimum value for an amount at which the voltage to be applied is increased may have beforehand been obtained through experiments, etc.

Then, in step S110, it is determined whether there exists a high frequency component. That is, it is determined whether a pulse current has been generated due to the increase of the voltage to be applied. This determination is carried out as in step S106. In cases where an affirmative determination is made in step S110, the routine goes to step S107 in order to suppress the occurrence of a pulse current. On the other hand, in cases where a negative determination is made in step S110, a return is made to step S109, and the voltage to be applied is increased again. In this manner, the voltage to be applied is increased until a pulse current is generated.

In this manner, by carrying out the feedback control of the voltage to be applied, the voltage to be applied can be made as high as possible in a range in which a pulse current is not generated. As a result of this, the condensation or aggregation of particulate matter can be further facilitated, so the number of particles in the particulate matter can be further decreased.

Here, note that in this embodiment, the initial value of the voltage to be applied may be made to be 0 or a relatively small value, and the voltage to be applied may be increased in a gradual manner until a high frequency component is detected. On the other hand, the initial value of the voltage to be applied may be made to be a relatively large value, and when a high frequency component is detected, the voltage to be applied may be decreased. The initial value of the voltage to be applied at this time may also be made to be a value at which a strong electric discharge is generated. In this case, it is not necessary to carry out an increase in the voltage to be applied. That is, when a negative determination is made in step S106, processing may be terminated, without carrying out the step S109 and the step S110.

Figure 7:
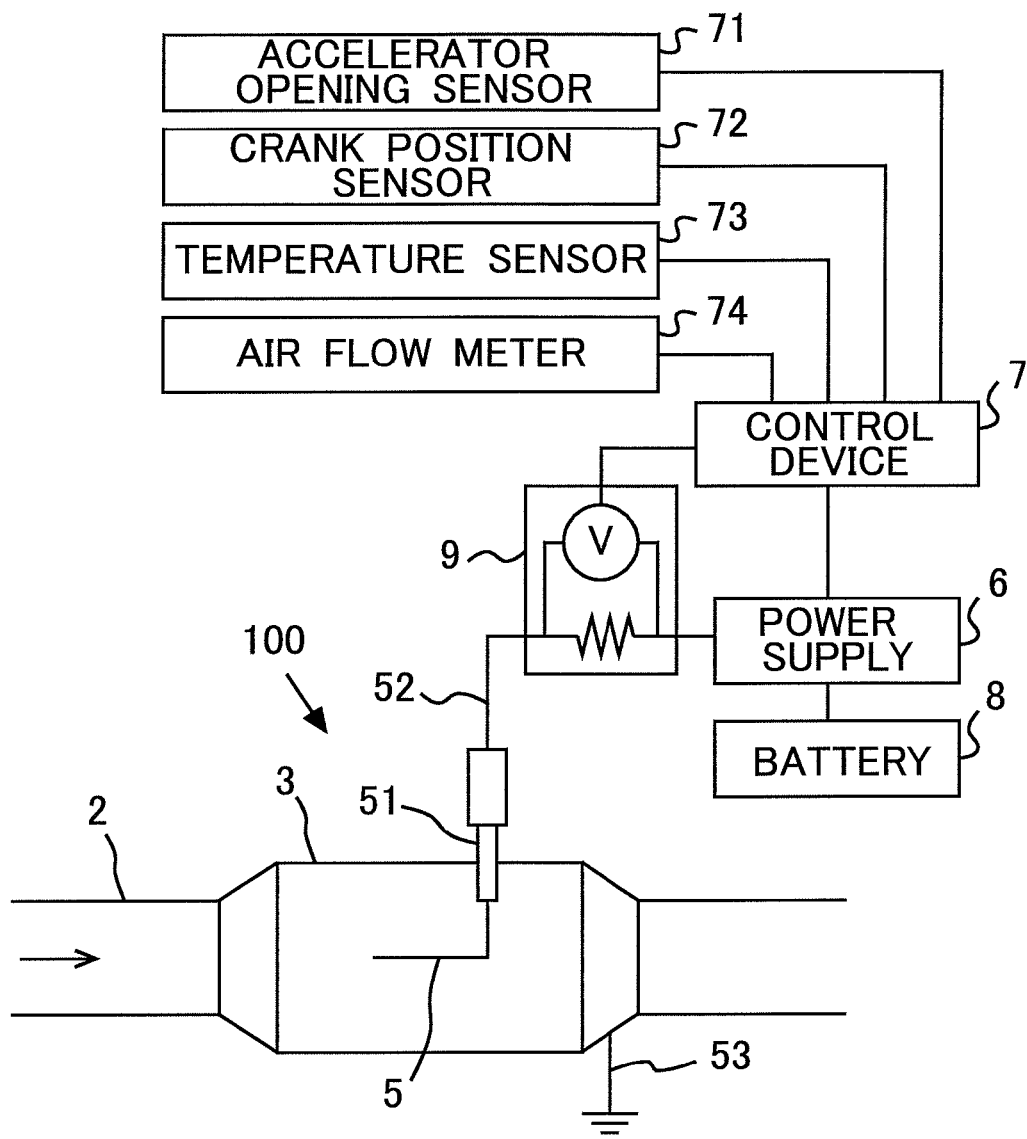
[FIG. 7] is another view showing the schematic construction of a particulate matter processing apparatus according to the embodiment of the present invention.

Here, FIG. 7 is a view showing the schematic construction of another particulate matter processing apparatus 100 according to this embodiment. What is different from the particulate matter processing apparatus 1 shown in FIG. 1 will be explained.

In the particulate matter processing apparatus 100 shown in FIG. 7, in a power supply side electric wire 52 between a power supply 6 and an electrode 5, there is arranged a detection device 9 which serves to detect an electric current passing through the power supply side electric wire 52. Thus, by arranging the detection device 9 in the power supply side electric wire 52, the insulation part 4 shown in FIG. 1 is unnecessary. That is, even if electricity flows from a housing 3 to the side of an exhaust passage 2, it is possible to detect an electric current passing through the electrode 5 by means of the detection device 9.

In the particulate matter processing apparatus 100 constructed in this manner, too, the electric current passing through the electrode 5 can be detected. However, in general, the power supply side electric wire 52 becomes thicker in diameter and longer than a ground side electric wire 53, and hence becomes larger in electric capacity than that. Accordingly, even if a strong electric discharge such as a corona discharge, etc., is generated, it becomes difficult to detect a pulse current. For this reason, the particulate matter processing apparatus 1 shown in FIG. 1 can detect a strong electric discharge in a more accurate manner than the particulate matter processing apparatus 100 can do, and hence can suppress the strong electric discharge in a more effective manner.

EXPLANATION OF REFERENCE NUMERALS AND CHARACTERS 1 particulate matter processing apparatus
2 exhaust passage
3 housing
4 insulation parts
5 electrode
6 power supply
7 control device
8 battery
9 detection device
21 flange
31 flange
51 insulator part
52 power supply side electric wire
53 ground side electric wire

The invention claimed is:

1. A particulate matter processing apparatus comprising:
an electrode that is arranged in an exhaust passage of an internal combustion engine with a voltage to be applied thereto being able to be changed;
a detection device that detects an electric current passing through said electrode;
a determination device that determines whether a pulse current has been generated in the electric current detected by said detection device; and
a control device that reduces said voltage to be applied more than that at this time in cases where a determination has been made by said determination device that a pulse current has been generated.

2. The particulate matter processing apparatus as set forth in claim 1, wherein said control device increases said voltage to be applied more than that at this time in cases where a determination has been made by said determination device that a pulse current is not generated.

3. The particulate matter processing apparatus as set forth in claim 1, further comprising:
a processing part that is arranged in said exhaust passage with said electrode installed therein;
an insulation part that insulates electricity between said processing part and said exhaust passage;

a ground part that grounds said processing part; and a power supply that is connected to said electrode and applies a voltage thereto;

wherein said detection device detects the electric current in said ground part.

4. The particulate matter processing apparatus as set forth in claim 3, wherein said electrode is lower in electric potential than said processing part.

5. The particulate matter processing apparatus as set forth in claim 1, wherein in cases where a high frequency component has been extracted by causing the electric current detected by said detection device to pass through a high pass filter, said determination device makes a determination that a pulse current has been generated.

* * * * *